(No Model.)
V. W. CODDINGTON.
SEPARABLE PULLEY.
No. 420,038. Patented Jan. 28, 1890.
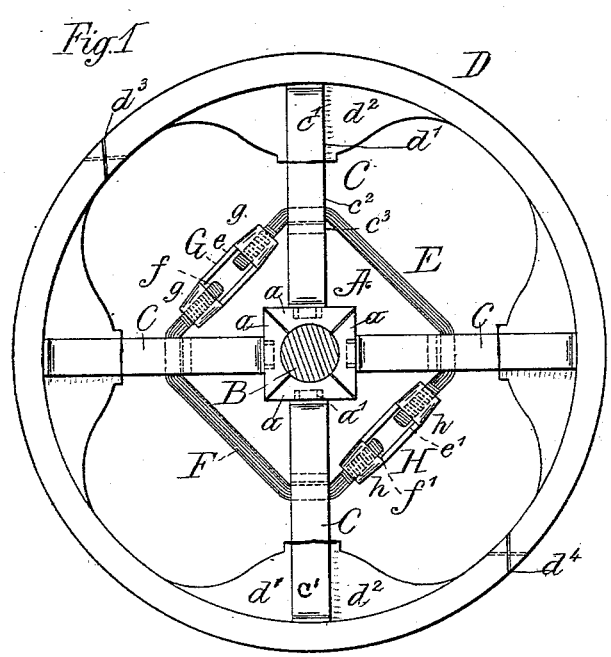
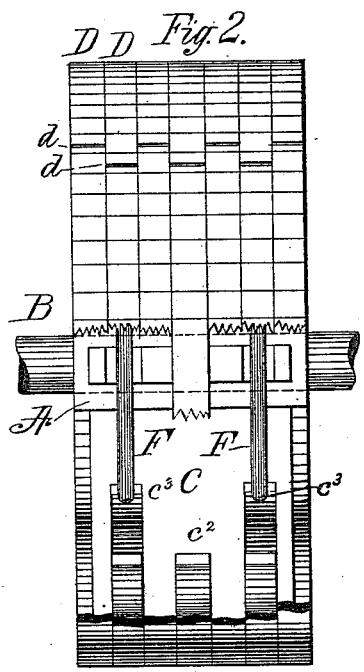
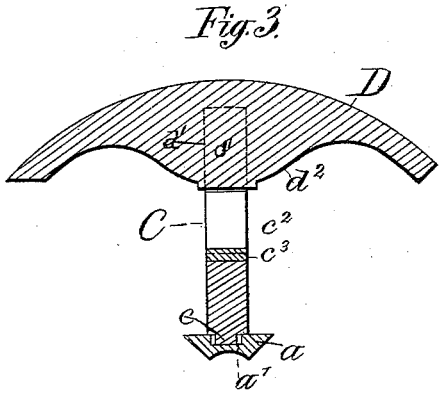
Witnesses
C. W. Kragh.
S. L. C. Hasson.
Inventor:
Vantyle W. Coddington
per Rich'd K. Manning
Attorney

UNITED STATES PATENT OFFICE.

VANTYLE W. CODDINGTON, OF KANSAS CITY, MISSOURI.

SEPARABLE PULLEY.

SPECIFICATION forming part of Letters Patent No. 420,038, dated January 28, 1890.

Application filed April 9, 1889. Serial No. 306,623. (No model.)

*To all whom it may concern:*

Be it known that I, VANTYLE W. CODDINGTON, a citizen of the United States, residing at Kansas City, in the county of Jackson and State of Missouri, have invented certain new and useful Improvements in Separable Pulleys; and I do hereby declare that the following is a full, clear, and exact description of the same, reference being had to the accompanying drawings, forming a part of this specification.

My invention has for its object to secure the separate parts of a separable pulley to the shaft in such a manner that an equal bearing of all said parts radially toward the center and upon circumference of said shaft may be maintained, and thus prevent slipping of the pulley.

My invention further consists in the novel construction and combination of parts, which will be first fully described, and specifically pointed out in the claims.

In the drawings, Figure 1 is a side elevation of the separable pulley, showing the means for securing the separate parts together and to the shaft. Fig. 2 is a view of the periphery of the pulley with a portion removed to show the slotted spokes and clamp-rods and shoe. Fig. 3 is a detail sectional view of one of the spokes and bracket, showing a sectional part of the hub removably connected to the spoke.

Similar letters of reference indicate corresponding parts in all of the figures.

In the construction of my improved pulley, A represents the hub, and B the shaft to which it is fitted. The hub A is cut or divided in the line of the diameter of shaft B into separate equal parts $a\ a\ a\ a$. From the separate parts $a\ a\ a\ a$ of the hub extend radially the spokes C C C C. In the outer portion of the parts $a\ a$ of the hub in the line of the diameter of shaft B are made the recesses $a'\ a'\ a'\ a'$. Upon one end portion of each one of the spokes C C C C is made a tenon $c$, which is smaller than the length of the slots $a'$ of the parts $a\ a$ of hub A, so as to slide laterally therein.

The periphery of the pulley consists of circular strips D D D, of the proper thickness and comparatively smaller in width, which are placed edgewise in position and secured together in any well-known manner. The material of the strips D D consists of short lengths fitted together at the ends, so as to break joints, as at $d\ d$.

For the purpose of strengthening the periphery of the pulley, the portion of the strips D D in line with the opposite sides of spokes C C are made thicker in the direction of hub A, and in a transverse relation to said strips D D in the internal surface are cut the transverse mortises $d'\ d'\ d'\ d'$, which receive the outer ends $c'$ of said spokes C C, and the portions of strips D D extending from the said spokes to the periphery of the pulley form the brackets $d^2\ d^2$. The periphery of the entire pulley is then cut at $d^3\ d^4$ into sectional parts between the spokes C C C C.

Through each one of the spokes C C C C, in a line of direction concentric to the periphery of the pulley, and extending radially from a point equidistant from the hub and brackets $d^2$ and in the direction of and to the said brackets, is made the slot $c^2$. In the end portion of slot $c^2$, toward the hub A, is inserted a shoe $c^3$. A short section of a tie-rod E is then made with right-hand screw-thread at one end $e$ and a left-hand screw-thread at the other end $e'$. One screw-threaded end $e$ of rod E is extended through the slot $c^2$ over shoe $c^3$ in one of the spokes C in one direction concentric to the periphery of the pulley, and the opposite end $e'$ is extended in an opposite direction through a like slot $c^2$ in a contiguous spoke C. A similar rod F is then made with a right-hand screw-thread at one end $f$ and a left-hand screw-thread at the other end $f'$. One end $f$ of rod F is inserted through slot $c^2$ in a spoke C contiguous to the spoke C having one screw-threaded end $e$ of rod E, and in the direction of said rod $e$ and the opposite screw-threaded end $f'$ of said rod F is extended in an opposite direction through a spoke C contiguous to the spoke carrying the screw-threaded end $e'$ of rod E.

To the respective opposing ends $e\ f\ e'\ f'$ of rods E F are adjustably attached the swivel-clamps G H, the opposite ends of each one of which clamps are made with screw-threaded openings $g\ g\ h\ h$ correspondingly to the direction of the thread upon the ends of the rods E F, which are opposite each other.

In the attachment of the pulley to the shaft the portions *a a* of the hub upon the ends of spokes C C are placed circumferentially around the shaft B, and the separable portions of the periphery, the joints of which at $d^3$ $d^4$ are composed of interlocking parts, brought in close relation. The rods E F are inserted in the openings in the spokes C C and the swivel-clamps attached to the respective ends of the clamp-rods, and both clamps turned to the right, which draws the opposite ends of the clamp-rods toward each other, and the draft upon the spokes is concentered in the line of the diameter of the shaft, so that an equal pressure is obtained radially upon the separable parts of the hub and also upon the shaft.

The separable parts *a a* of the hub A, which are loosely connected with the spokes C, so that the tenons move laterally and permit the sections of the hub to adjust themselves to the inequalities of the shaft, are readily adapted to varying sizes of shaft, the diameter of which is first ascertained, and the hub is made that its opening is of the required size of the shaft without necessarily altering the length of the spokes.

In pulleys of great width two or more clamping-rods will be used and connected to the spokes in like manner as that seen in Fig. 2, and as the strain upon the spokes is brought more directly upon the shoes in the spokes, which shoes are made preferably from iron, the liability of splitting the spoke is made less.

Having fully described my invention, what I now claim as new, and desire to secure by Letters Patent, is—

1. In a separable pulley having radial spokes and a separable hub having end bearings for said spokes in the separable parts thereof, the combination of tie-rods arranged in the line of direction concentric to the periphery of said pulley, the meeting ends of said rods being adjustably clamped together and adapted to draw the ends of said spokes toward the center of said pulley, as described.

2. In a separable pulley having spokes and slots in said spokes in the line of direction concentric to the periphery of said pulley, the combination of tie-rods also in the line of direction concentric to the said periphery, having right-hand screw-threads at one end and left-hand screw-threads at the other end, and swivel-clamps connected with the opposing ends of said rods, for the purpose described.

3. In a separable pulley having suitable tie-rods in the line of direction concentric to the said periphery, adjustably clamped together upon the separable parts of said pulley, and a separable hub provided with recesses extending in a transverse relation to said hub, the combination of spokes having tenons fitting in said recesses in separate parts of said hub, and said recesses adapted to permit the lateral adjustment of the separate parts of the hub, as described.

VANTYLE W. CODDINGTON.

Witnesses:
J. E. LATHAM,
S. L. C. HASSON.